L. J. WICKS.
Churn.
No. 24,686.
Patented July 5, 1859.
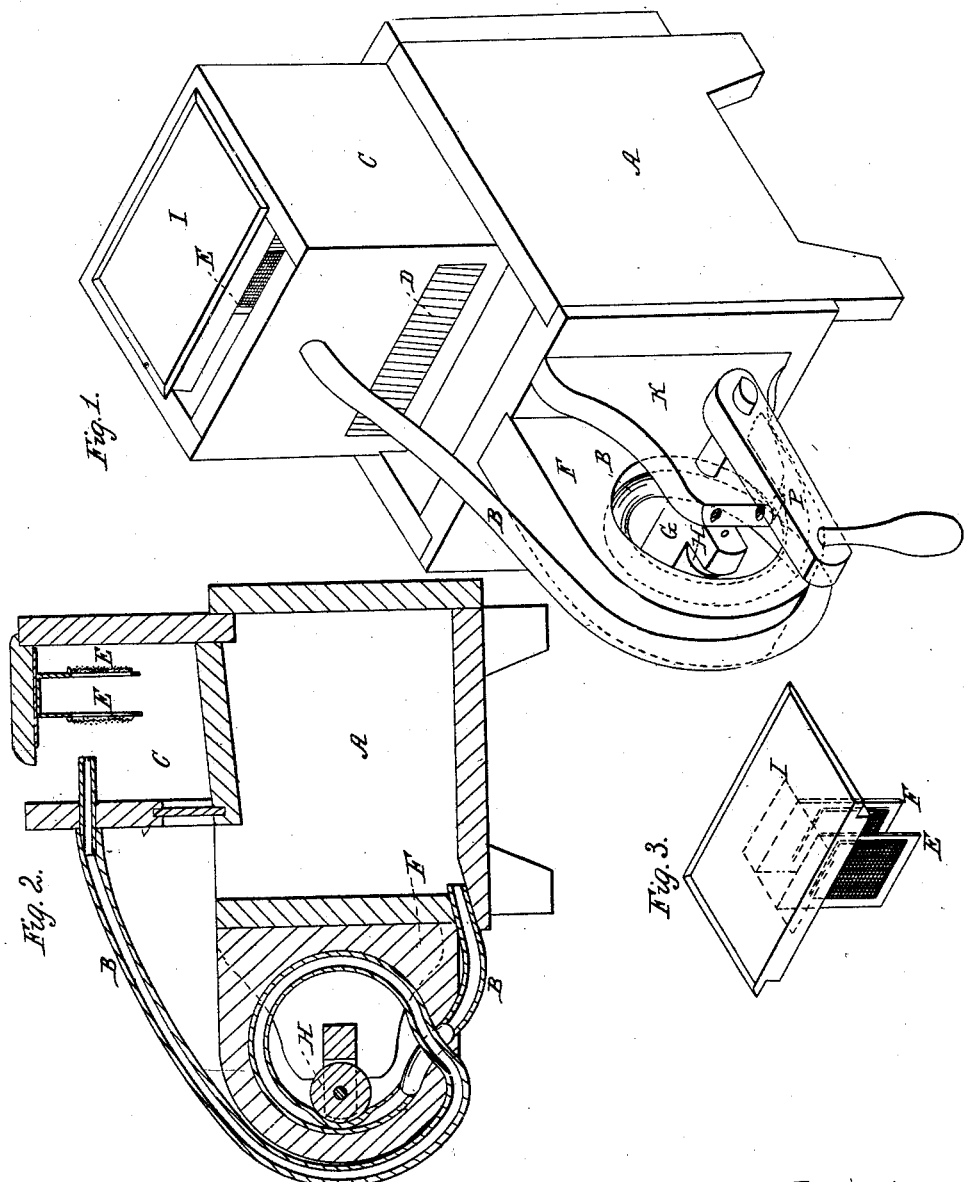
Witnesses:
Inventor:

UNITED STATES PATENT OFFICE.

LOREN J. WICKS, OF RACINE, WISCONSIN.

CHURN.

Specification of Letters Patent No. 24,686, dated July 5, 1859.

*To all whom it may concern:*

Be it known that I, L. J. WICKS, of Racine, in the State of Wisconsin, have invented certain new and useful Improvements in Churns; and I do hereby declare the following to be a full, clear, and exact description of the same, reference being had to the accompanying drawings and the letters of reference marked thereon.

The nature of my invention consists in producing butter by a certain combination of devices—the peculiarities of which will be hereinafter fully described.

In order that others skilled in the art may make and use my invention, I will now describe its construction and operation.

In the drawings Figure (1) is a perspective. Fig. (2) is a side elevation. Fig. 3 is a view of the cap with gage wire partitions suspended from its bottom.

A represents the box in which the milk is placed. (C) is also a box of smaller dimensions—which sits on the top of box A a space should be left intervening between the fronts of each box—in order that the milk may pass from (C) into (A).

(D) represents a screen, which may be constructed—by fine strips of wood—set up perpendicularly and at very short intervals apart in the front of box (C). Said screen is designed for the purpose of permitting the milk to flow back into box A, and retaining the butter in box (C).

(I) is a cap, which sets upon box (C). Said cap has two gauze wire partitions suspended from its bottom. These partitions are made by taking two pieces of tin, and cutting a few inches square in each, and welding or soldering the gauze wire over the holes thus made in the tin, which can then very conveniently be secured to the under side of cap (I). Said cap is made narrow, in order that it may slide freely backward and forward, the necessity for which will be hereafter more fully seen.

(F) is a circular frame, with a groove around its inner surface.

(B) is an india rubber pipe, one end of which is inserted in a hole at the bottom of box A. It is then run through a hole in the bottom of frame (F), passed around in the groove, and out again through the same hole, thence around the frame (F), and its end inserted in box (C), as shown in Fig. (2).

(K) are supports for shaft G. On said shaft are two projections, as seen in Fig. (1). Between said projections wheel or pulley (H) revolves. Thus it will plainly be seen that in the manner which pipe (B) passes round circular frame (F) the pulley when rolling on it will force the milk up into box (C).

The operation of my machine is as follows. Milk being placed in box (A) the crank P is turned with considerable rapidity. The milk entering the pipe at the bottom of box A seeks to rise of course to its own level. The pulley H revolving on pipe (B) forces the milk up and around into box (C) with a great deal of force against the gauze wire partitions (E E). The globules being thus broken, the milk passes out through screen D into box A. Thus a continued stream may be ejected until every particle of butter is separated from the milk. This mode of churning is based upon scientific principles, and the variety of churns which are adapted as being the best, are only mere approximations to the principle embraced in this churn. The globules which contain the butter are both very small and elastic, and to break them effectually, requires an action upon each one of them. Thus it is I obtain butter in a shorter space of time, and more of it, than in any other way, as yet known. In the ordinary churn, only those globules are thoroughly broken, which come in contact with the dasher, and when there is a quantity of milk being churned in the same vessel, it is utterly impossible to impart a blow to each globule, as expeditiously, and effectually, as when each one successively is ejected through a small orifice, against a substance, which must of necessity break them. However I do not claim the principle as here embodied, *i. e.* of producing butter by forcing the milk in a stream against a substance, as the same principle is mentioned in scientific works; but having thus fully described my invention what I claim as new and desire to secure by Letters Patent is—

1. The combination of the box A, the pipe B, and the box, C, when the same are used in the manner and for the purpose herein set forth.

2. Placing the box C, over the box A, and providing said box C, with a screen D, and depending wire gauze partitions E, E, substantially in the manner and for the purpose specified.

L. J. WICKS.

Witnesses:
A. W. THOMPSON,
A. S. CHITTENDEN.